2,968,004
Patented Jan. 10, 1961

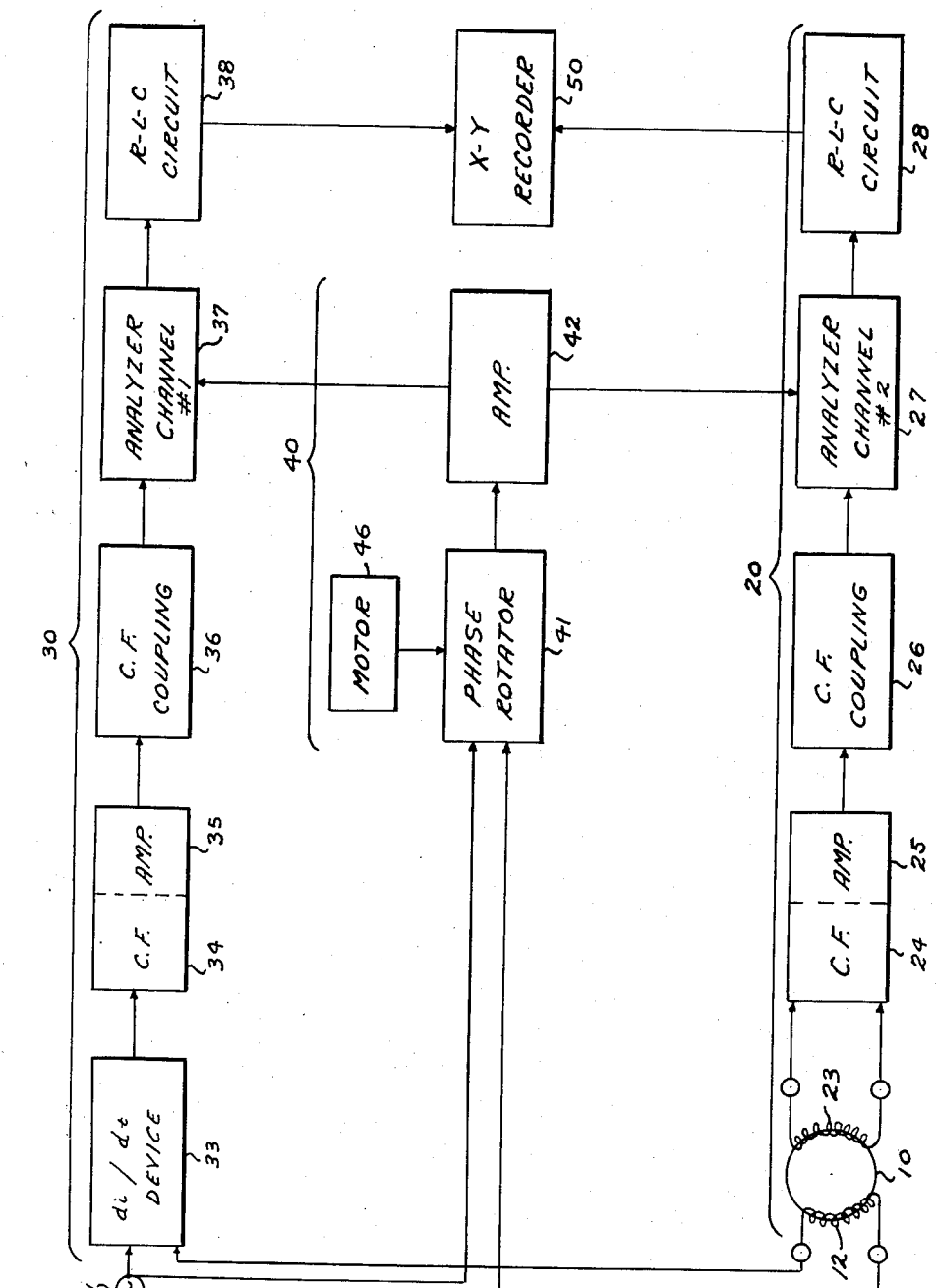

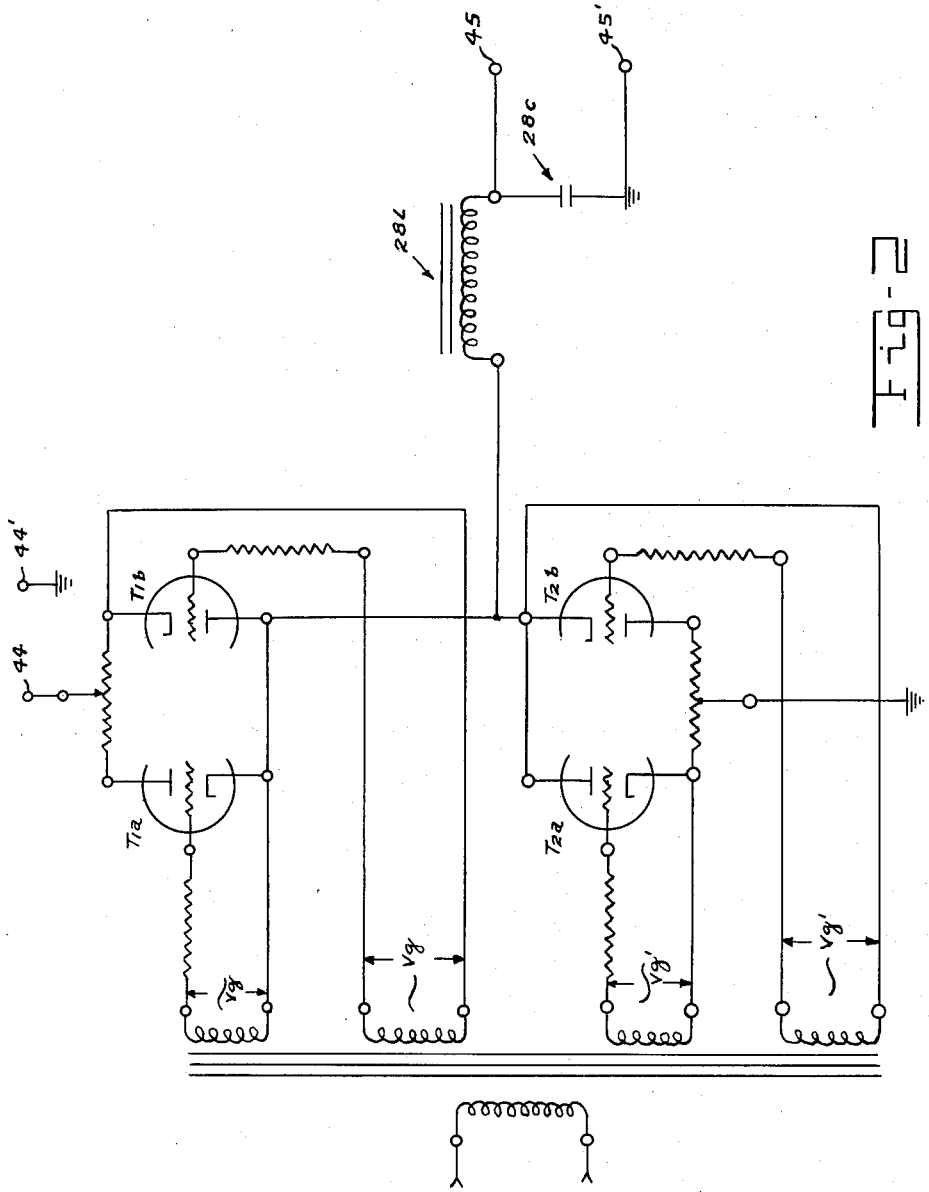

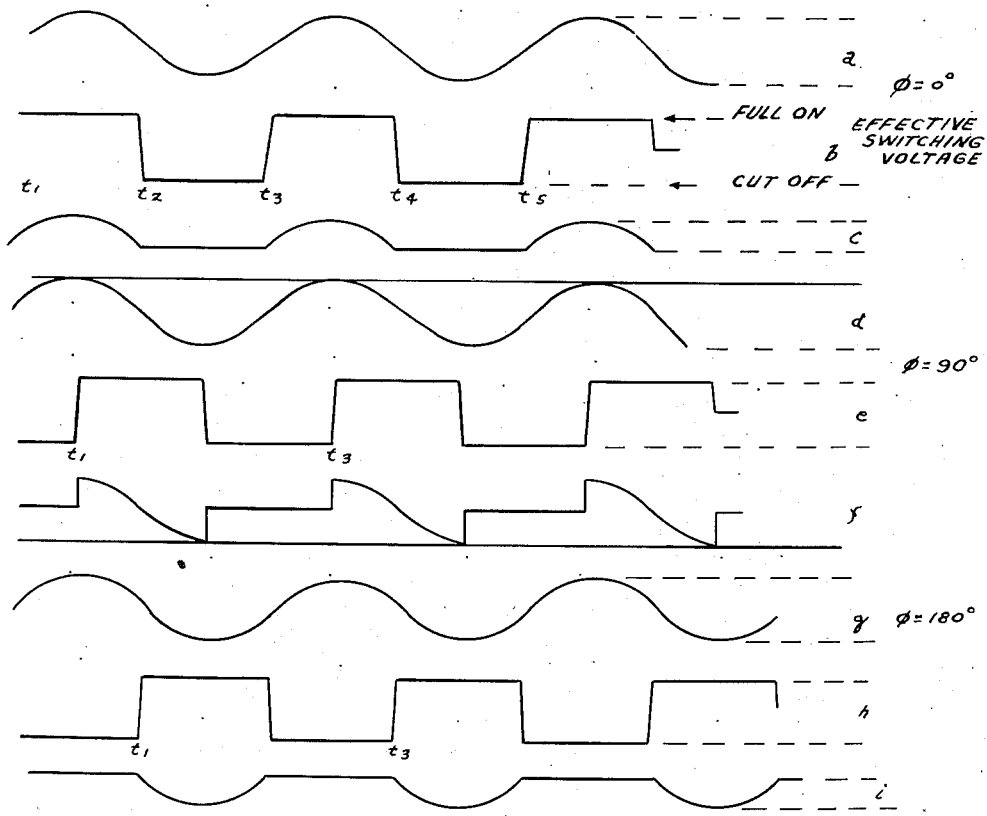
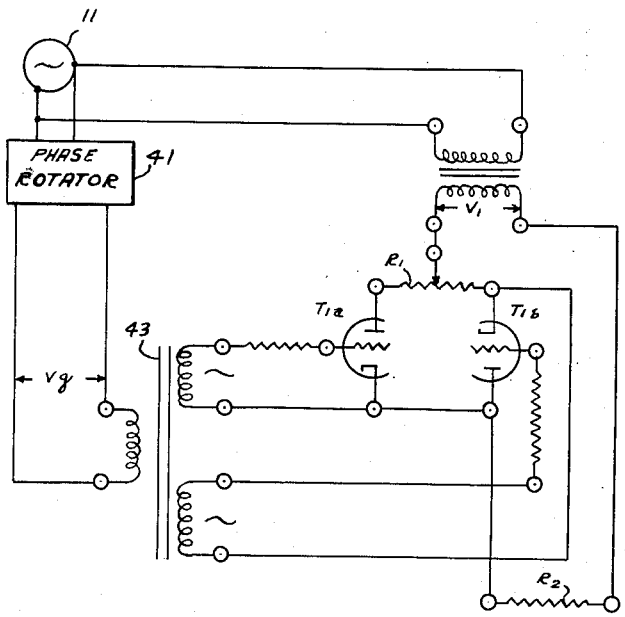

2,968,004

ANALYZER CHANNEL FOR USE IN AN AUTOMATIC HYSTERESIS LOOP RECORDER

Ernst R. Czerlinsky, Arlington, and Raymond A. MacMillan, Greenwood, Mass., assignors to the United States of America as represented by the Secretary of the Air Force Original application Sept. 27, 1956, Ser. No. 612,569. Divided and this application Aug. 18, 1958, Ser. No. 755,817

1 Claim. (Cl. 328—133)

(Granted under Title 35, U.S. Code (1952), sec. 266)

The invention described herein may be manufactured and used by or for the United States Government for governmental purposes without payment to us of any royalty thereon.

This is a divisional application of the application of Ernst R. Czerlinsky and Raymond A. MacMillan, filed September 27, 1956, Serial No. 612,569, Patent No. 2,922,949.

This invention relates to an analyzer channel for use in an automatic hysteresis loop recorder.

One object of the invention is to provide an analyzer channel for switching half period segments of magnetizing current, or the voltage induced in the secondary winding of a sample under test over the entire period of the magnetizing current.

This and other objects will be more fully understood from the following detailed description taken with the drawings wherein:

Fig. 1 is a block diagram of the measuring and recording device in which the analyzer channel of the invention may be used.

Fig. 2 is a schematic wiring diagram of an analyzer channel in accordance with the present invention.

Fig. 3 is a schematic wiring diagram of a circuit to aid in the explanation of the operation of the analyzer channel of Fig. 2.

Fig. 4 shows waveforms for illustrating the operation of the analyzer channel of Fig. 2.

Referring to Fig. 1 of the drawing, the device consists generally of a frequency source 11, which may have a frequency range of from 50 to 5000 c.p.s., a circuit 20 for measuring the magnetic flux induced in a sample 10, a circuit 30 for measuring the magnetizing force, a phase rotator circuit 40 and an X—Y recorder 50.

Frequency source 11 supplies the magnetizing force to the sample 10 by way of winding 12. The voltage $V_s$ induced in the secondary winding 23 is proportional to the derivative of the magnetic flux B induced in the core by the magnetizing force H. The voltage across winding 23 is applied to an analyzer channel 27 through a cathode follower 24, an amplifier 25 and a cathode follower coupling circuit 26. The switching and stepping of the half period segments are accomplished by the cooperation of the analyzer channel and the phase rotator.

The operation of the analyzer channel 27 and the phase rotator 41 is best explained with reference to Fig. 2 and Fig. 3.

Referring first to Fig. 3, tube $T_{1a}$ has its cathode connected directly to the anode of tube $T_{1b}$ and its anode connected to the cathode of $T_{1b}$ through a resistor $R_1$. With no external voltage applied, a certain number of electrons will be emitted from each cathode by thermal emission. Due to the tube connections these electrons will cause a current to circulate between the two tubes and no current will flow through $R_2$, if the potentiometer slide is adjusted for balance. However, if a voltage source is added in series with $R_2$ the tubes will become unbalanced with more current flowing in one tube than in the other and the difference will flow in $R_2$. When an alternating voltage $V_1$ is connected in series with $R_2$ a corresponding A.C. current will flow in $R_2$.

If then an alternating voltage $V_g$ is applied in identical phase to the control grids of tubes $T_{1a}$ and $T_{1b}$ through a transformer 43, or other source, both tubes will be driven to full conduction during the positive half cycle of said alternating grid voltage and to cutoff during the negative half cycle. Thus either tube $T_{1a}$ or $T_{1b}$ is made conducting for one half cycle of grid voltage and both are cut off during the following half cycle. If voltages $V_g$ and $V_1$ are obtained from the same power supply the current $I_r$ through $R_2$ is proportional to the voltage $V_1$ during the conducting times $t_1$—$t_2$, $t_3$—$t_4$, etc. as shown in Fig. 4, c. The current is zero during the times $t_2$—$t_3$, $t_4$—$t_5$, etc.

The phase difference between $V_1$ and $V_g$ determines the segment of voltage $V_1$ that causes the current to flow in $R_2$ during the time $t_1$—$t_2$, $t_3$—$t_4$, etc. When the phase difference is zero, the current $I_r$ is as shown in Fig. 4, c and will have an average value equal to $$\frac{A}{\pi}$$

With the phase difference equal to 90°, the current $I_r$ will be as shown in Fig. 4, f and will have an average value equal to zero. With the phase difference equal to 180°, $I_r$ will be as shown in Fig. 4, i and will have an average value equal to $$-\frac{A}{\pi}$$

In the general case when a voltage containing a fundamental and odd harmonics is applied, the average current produced by the fundamental is:

$$i_{1av} = \frac{1}{T}\int_{t_1}^{t_2} I_1 \sin \omega t \, dt = -\frac{I_1}{\omega T}\Big|\cos \omega t\Big|_{t_1}^{t_2}$$

And the average produced by the $n$th harmonic is:

$$i_{nav} = \frac{1}{T}\int_{t_1}^{t_2} I_n \sin n\omega t \, dt = -\frac{I_n}{n\omega T}\Big|\cos n\omega t\Big|_{t_1}^{t_2}$$

Then if the conducting time $t_2$—$t_1 = T/2$ the average currents are:

$$i_{1av} = \frac{I_1}{\pi}\cos \omega t_1 \qquad i_{nav} = \frac{I_n}{n\pi}\cos n\omega t_1$$

where $\omega t_1$ represents the phase angle between $V_1$ and $V_g$.

The phase difference between voltage $V_1$ and $V_g$ can be swept continuously through phase angles of from 0 to 360° by a phase rotator 41. The phase rotator should receive its energizing current from the same frequency supply that supplies $V_1$ and may be driven by adjustable speed motor.

Referring now to Fig. 2 wherein resistor $R_2$ of Fig. 3 is replaced by an L—C circuit, the inductance 28L, the condenser 28C and tubes $T_1$ and $T_2$ make up an R—L—C circuit, with the distributed R being the sum of resistance of the inductance, resistances of tubes $T_{1a}$ and $T_{1b}$ and connected circuit.

When a sinusoidal voltage of the same frequency as $V_g$ is applied to terminals 44 and 44' with a phase difference between the two voltages equal to zero, the direct (D.C.) voltage at terminals 45 and 45' rises to a value of $$\frac{2}{\pi}$$

times the amplitude of the voltage at terminals 44 and 44', if $$\omega_{LC} = 1/\sqrt{LC} \ll \omega$$

and if there is no discharge during the cutoff time, $\omega$ being the frequency for switching tubes $T_{1a}$ and $T_{1b}$ between full conducting and cutoff. With $L=400$ $h$, $c=400$ $\mu$f. and $R=15,000$ ohms, condenser 28C will charge to 99% of its final amount in about 70 seconds.

If a second set of tubes $T_{2a}$ and $T_{2b}$ are provided having a voltage $V_g'$ applied to their grids which is from the same source as $V_g$ but which is 180° out of phase with respect to $V_g$, these tubes will conduct during the times that tubes $T_{1a}$ and $T_{1b}$ are cut off and the voltage at terminals 45 and 45' rises to a value not greater than $$\frac{1}{\pi}$$

times the amplitude of the voltage at terminals 44 and 44'. Since tubes $T_{2a}$ and $T_{2b}$ will conduct during the time that tubes $T_{1a}$ and $T_{1b}$ are cut off, the energy stored in the choke 28L will, in a large part, be transferred to the condenser 28C, thereby shortening the charging time for the condenser to approximately 4 sec. The final voltage on the condenser then will be a D.C. voltage with a negligible superimposed alternating voltage. As can be seen the speed of the phase rotator must be made slow enough to allow the condenser 28C to reach the proper value of charge for each phase position of the phase rotator.

Then if the voltage applied to terminals 44 and 44' is the output of cathode follower 26 and $V_g$ is the output of phase rotator 41, the D.C. voltage across terminals 45 and 45' is proportional to the flux B.

As can be seen from Fig. 1, this analyzer channel can also be used for obtaining a D.C. voltage proportional to the magnetizing force H.

There is thus provided an analyzer channel for switching half period segments of magnetizing current or the voltage induced in the secondary winding of a sample under test over the entire period of the magnetizing current.

While the invention has been described with reference to a particular embodiment, it will be understood that numerous changes may be made without departing from the general principles and scope of the invention.

We claim:

A switching circuit comprising a first pair of electron discharge tubes, each tube having an anode, a cathode and a control grid, first means connecting the anode of one of said tubes to the cathode of the other tube, second means connecting the cathode of said one of said tubes to the anode of said other tube, an alternating voltage supply source, a first circuit comprising an inductance and a capacitance, said first pair of tubes, said voltage source and said first circuit being connected in series, a second circuit for applying the alternating voltage from said source to the grids of said first pair of tubes, said second circuit comprising phase rotating means for changing the phase relation between the voltage in said first circuit and the voltage applied to the grids of said first pair of tubes, a second pair of electron discharge tubes, each tube having an anode, a cathode and a control grid, third means connecting the anode of one of said second pair of tubes to the cathode of the other of said second pair of tubes, fourth means connecting the cathode of said one of said second pair of tubes to the anode of said other of said second pair of tubes, said second pair of tubes being connected in parallel with said first circuit, and fifth means for applying to the grids of said second pair of tubes an alternating voltage which is 180 degrees out of phase with respect to the voltage applied to the grids of said first pair of tubes.

References Cited in the file of this patent

UNITED STATES PATENTS

| | | |
|---|---|---|
| 1,995,810 | Klemperer | Mar. 26, 1935 |
| 2,057,485 | Haller | Oct. 13, 1936 |
| 2,246,179 | Lord | June 17, 1941 |
| 2,320,790 | Moyer et al. | June 1, 1943 |
| 2,394,084 | Livingston | Feb. 5, 1946 |
| 2,502,887 | Rava | Apr. 4, 1950 |
| 2,564,347 | Solomon | Aug. 14, 1951 |
| 2,666,887 | Rockafellow | Jan. 19, 1954 |
| 2,839,708 | Wideroe et al. | June 17, 1958 |

FOREIGN PATENTS

| | | |
|---|---|---|
| 448,302 | Great Britain | June 5, 1936 |